United States Patent [19]

Fukui

[11] 4,416,348  
[45] Nov. 22, 1983

[54] COWLING FOR TRICYCLE VEHICLE

[75] Inventor: Takumi Fukui, Iwata, Japan

[73] Assignee: Yamaha Hatsudoki Kabushiki Kaisha, Iwata, Japan

[21] Appl. No.: 184,651

[22] Filed: Sep. 5, 1980

[30] Foreign Application Priority Data

Sep. 13, 1979 [JP] Japan .................. 54-117736

[51] Int. Cl.³ .............................................. B60J 1/04
[52] U.S. Cl. ................................... 180/210; 180/215; 180/54 A
[58] Field of Search ............... 180/210, 211, 212, 225, 180/229, 54 A, 219; 296/78.1

[56] References Cited

U.S. PATENT DOCUMENTS

| 2,495,090 | 1/1950 | Borden | 180/54 A |
| 2,792,889 | 5/1957 | Piatti | 180/229 |
| 4,191,269 | 3/1980 | Nagashima et al. | 180/217 |
| 4,347,909 | 9/1982 | Takemura | 180/219 |

FOREIGN PATENT DOCUMENTS

| 524557 | 12/1953 | Belgium | 180/229 |
| 477708 | 2/1953 | Italy | 180/229 |
| 48-29095 | 4/1973 | Japan | |
| 48-23365 | 7/1973 | Japan | |
| 49-2349 | 1/1974 | Japan | |
| 49-6030 | 2/1974 | Japan | |
| 138714 | 2/1920 | United Kingdom | 180/229 |
| 141194 | 4/1920 | United Kingdom | 180/229 |
| 831375 | 3/1960 | United Kingdom | 180/229 |

Primary Examiner—John A. Pekar  
Attorney, Agent, or Firm—Donald D. Mon

[57] ABSTRACT

A cowling for a motor-driven tricycle vehicle having two rear wheels, a front wheel, and an engine and a seat. The cowling is in two members: a front and a rear member, which are independently attached and removable to the vehicle body. A split is provided between the sections to admit cooling air to the engine inside the cowling.

4 Claims, 4 Drawing Figures

COWLING FOR TRICYCLE VEHICLE

FIELD OF THE INVENTION

This invention relates to a cowling for a tricycle vehicle having two rear wheels and one front wheel.

BACKGROUND OF THE INVENTION

In a conventional tricycle vehicle having two rear wheels and one front wheel, a cowling is attached thereto for partially covering the engine and its vicinity, and also the drive mechanism of the rear wheels. With a view to ensuring the safety of a driver, it is desirable that the body of the tricycle vehicle as a whole be covered by the cowling so that no portion of the body protrudes. By covering the whole body with the cowling, moreover, it is possible to provide a tricycle with reduced air resistance and an excellent design.

However, if the tricycle body as a whole is covered with a one-piece cowling, there arises the disadvantage that maintenance of the engine becomes more difficult.

The present invention has been conceived to eliminate this disadvantage and contemplates to provide a tricycle cowling which hides projections of the tricycle body, thereby to improve the safety, reduce air resistance, and enable optimal maintenance of the engine.

BRIEF DESCRIPTION OF THE INVENTION

In order to attain the above advantages, according to the present invention, there is provided a tricycle cowling which includes a front cowling member covering the back of a steering head pipe, and a rear cowling member formed to extend from the front cowling member and to cover the engine. The front and rear cowling members are detachably attached to the body of the tricycle.

The present invention will now be described in detail with reference to the accompanying drawings, in which:

DETAILED DESCRIPTION OF THE INVENTION

Figure 4:
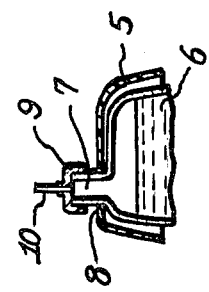

In the drawings a steering head pipe 1, a front fork 2 which is rotatably borne in the steering head pipe 1, a front wheel 3, and a handle 4 are shown. A front cowling member 5 is formed to cover the back of steering head pipe 1. A fuel tank 6 is disposed in front cowling member 5. Front cowling member 5 is shaped to cover the upper side and the right and left sides of the fuel tank 6. As is apparent from FIG. 4, the front cowling member 5 is formed with an opening 8 through which the mouth 7 of fuel tank 6 protrudes upward. A cap 9 is fastened to the mouth 7 which rises from the opening 8. A breather pipe 10 is connected to cap 9 so that the upper space in the fuel tank 6 may be vented to the atmosphere.

Rear wheels 11 and a rear cowling member 12 are shown. Rear cowling member 12 is formed into a saddle shape so that its front edge extends at slits 13 to the aforementioned front cowling member 5. Front cowling member 5 has both of its walls depressed partially at the slits 13 inwardly of the rear cowling member 12 thereby to define in-between inlets 14 for engine cooling air flow. The rear cowling member 12 has its rear portion formed into finders 15 which are sized and shaped to cover the rear wheels 11 at their upper and front sides.

An air-cooled engine 16 and a tail pipe 17 are shown. Engine 16 is installed on the tricycle at such a position that its upper and right and left sides are enclosed by rear cowling member 12. Tail pipe 17 extends backward within the rear cowling member 12. As a result, the aforementioned slits 13 are positioned in front of the engine 16 so that the air flow coming from the aforementioned inlets 14 formed in the slits 13 is introduced into the rear cowling member 12 thereby to cool the engine 16. A starting handle 18 for pulling the starting rope of engine 16, a pair of foot rests 19, a shift pedal 20 and a brake pedal 21 are shown.

Rear cowling member 12 is detachably attached to the frame of the tricycle. More specifically, a hook 22 is fixed to the inner side of the rear portion of the rear cowling member 12 such that it is opened toward the front of the tricycle body. The hook 22 thus fixed is retained through an elastic member 24 upon a cross member 23 which is transversely fixed while forming a part of the frame. To the back side of the center portion of the rear cowling member 12 there is fixed another hook 25 which is retained on a lock rod 26 at the frame side. This lock rod 26 can be released from its retaining condition of the hook 25 by operating a not-shown operating mechanism through an opening 27 which is formed in the side of the rear cowling member 12.

Figure 1:
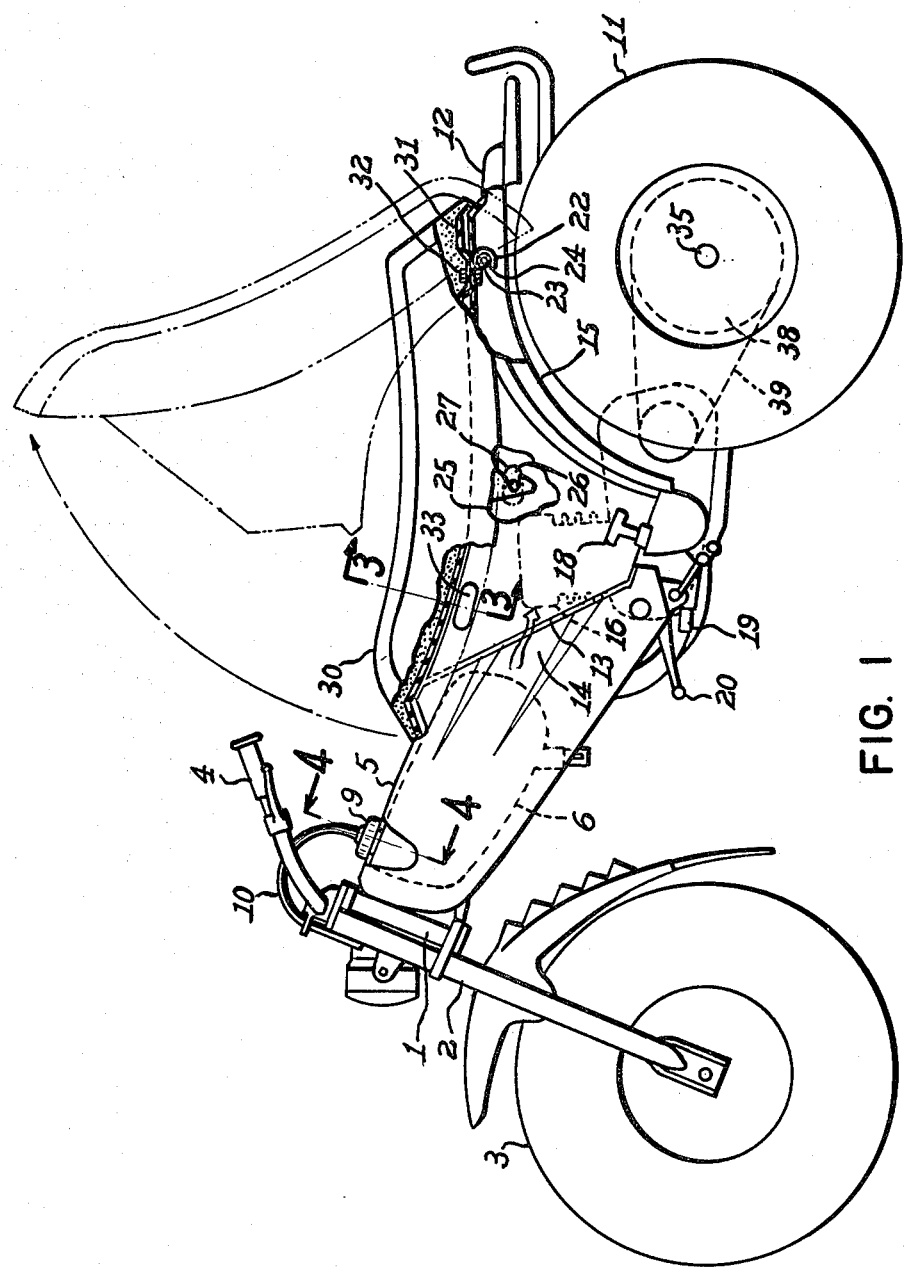
FIG. 1 is a side elevation showing in partial section one embodiment of the present invention.

As a result, if the retention of hook 25 by the lock rod 26 is released by the operating mechanism, the rear cowling member 12 has its front portion opened upward (to the position shown in double-dotted lines in FIG. 1). If, moreover, the rear cowling member 12 is shifted backward, the hook 22 can be disengaged from the elastic member 24 of the cross member 23.

An elongated seat 30 is shown which is integrally fixed to the saddle portion of rear cowling member 12 by means of a plurality of bolts 32 (only one of which is shown in FIG. 1). Thus, rear cowling member 12 and seat 30 are attached to and detached from the tricycle frame together.

Figure 3:
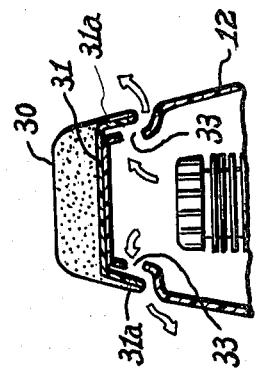
FIGS. 3 and 4 are sections taken along lines III—III and IV—IV of FIG. 1, respectively.

Seat bottom plate 31 has its inside depressed upwardly and its peripheral edge 31a bent obliquely downwardly. Rear cowling member 12 has its saddle portion protruding into the inside of seat bottom plate 31. Moreover, a rear cowling member 12 has its sides formed at their upper portions with outlets 33 which are opened long in the longitudinal direction. Peripheral edge 31a of seat bottom plate 31 is arranged to face the outer side of those outlets 33. As is apparent, it faces the outer side of those outlets 33. As is apparent from FIG. 3, outlets 33 are formed to allow air flow between the inside and outside of the rear cowling member 12 but these are not seen directly from the outside because of the existence of the peripheral edge 31a of the seat bottom plate 31.

Figure 2:
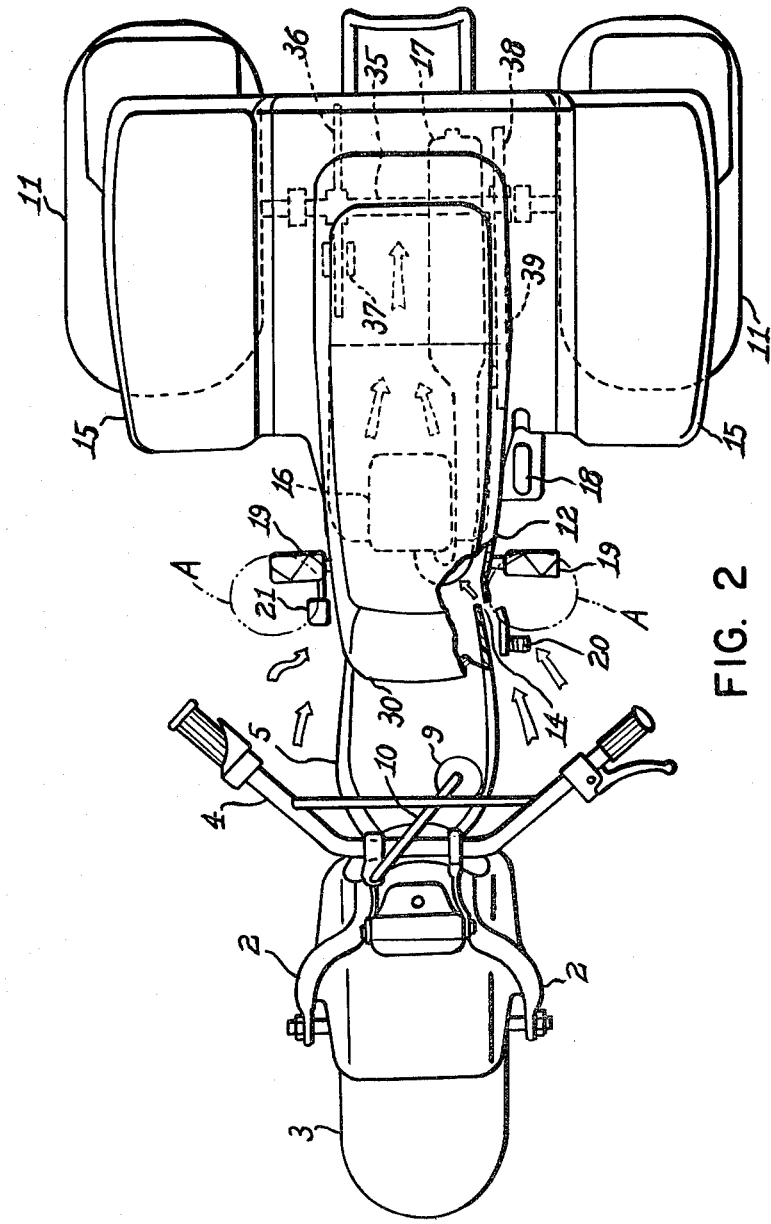
FIG. 2 is a partially sectional top plan view of the same.

Reverting to FIGS. 1 and 2, there are shown a rear axle 35, a brake disc 36 and a brake shoe 37, respectively. A sprocket 38 is fixed to the rear axle 35 and is driven by engine 16 through a chain 39.

In the embodiment having the construction thus far described, while the vehicle is running, the on-coming air flows along both sides of front cowling member 5 until it enters the inside of the rear cowling member 12 through the inlets 14 which are opened at the splits 13. As a result, the on-coming air sufficiently impinges on the engine 16, which is surrounded by the rear cowling member 12, so that the engine 16 is cooled down. The air flow, having cooled the engine 16, passes through the inside of the rear cowling member 12 to the back of the vehicle.

It should be noted in the present embodiment that the feet of the driver are positioned at both sides of inlets 14, as shown in double-dotted lines A in FIG. 2. As a result, the on-coming air is introduced by the feet into the inlets 14 so that the engine 16 can be cooled more satisfactorily. In other words, the feet of the driver act to guide the coming air into the inlets 14.

During idling operation of the vehicle, the air in the rear cowling member 12 is heated so as to rise past the engine 16. Since the rear cowling member 12 is formed with outlets 33, the heated air can flow out of the vehicular body through the outlets 33. In this instance, however, since the peripheral edge 31a of the seat bottom plate 31 is disposed to cover the outer sides of the outlets 33, neither rain droplets nor washing water will flow into the rear cowling member 12. Moreover, since the outlets 33 are not seen directly from the outside, the appearance is improved.

According to the embodiment, since the fuel tank 6 is disposed in the front cowling member 5 so that its mouth 7 rises from the front cowling member 5, the assembly can be facilitated, and the attachment and detachment of the front cowling member 5 can also be facilitated.

As has been described hereinbefore, according to the present invention, the cowling covering the whole vehicular body is composed of the front and rear members which are detachably attached thereto. For the maintenance of the engine, it is sufficient to detach only the rear cowling member, and it is unnecessary to detach the cowling as a whole so that the detachment procedure can be simplified. Moreover, since the vehicular body is wholly covered with the cowling, it is possible to provide a vehicle which has its projections reduced to improve the safety, to decrease the air resistance, and to provide an excellent design.

This invention is not to be limited by the embodiment shown in the drawings and described in the description, which is given by way of example and not of limitations, but only in accordance with the scope of the appended claims.

I claim:

1. A cowling for a tricycle vehicle of the type having a body, two rear wheels, one forward steerable wheel, a steering head pipe for steering said forward wheel, and an engine disposed forwardly of the rear wheels and rearwardly of the forward wheel, said cowling comprising: a front cowling member rearwardly of said steering head pipe, disposed so as to be grippable by the knees of the rider, a rear cowling member disposed rearwardly of said front cowling member, the front portion of the rear cowling member extending above the rear portion of the front cowling member, a seat on said rear cowling member; and a fuel tank mounted to said body forwardly of said seat and immediately rearwardly of said steering head pipe, said front cowling member covering said fuel tank, and said cowling members being detachably attached to said body.

2. A cowling according to claim 1 in which said front cowling member is depressed at its rear end inwardly of said rear cowling member whereby to define forwardly-facing inlets for cooling air flow to said engine.

3. A cowling according to claim 1 in which outlets are formed through said rear cowling member above said engine to provide for exit of air which has flowed past said engine, and in which a seat bottom plate is spaced from overhangs and faces said outlets.

4. A cowling according to claim 2 in which outlets are formed through said rear cowling member above said engine to provide for exit of air which has flowed past said engine, and in which a seat bottom plate is spaced from overhangs and faces said outlets.

* * * * *